(12) United States Patent
Maekawa (10) Patent No.: US 7,079,460 B2
(45) Date of Patent: Jul. 18, 2006

(54) OPTICAL POWER LEVEL-CONTROLLING DEVICE FOR STABLE OSCILLATION OF LASER DIODE

(75) Inventor: Yuichi Maekawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 476 days.

(21) Appl. No.: 10/370,438

(22) Filed: Feb. 19, 2003

(65) Prior Publication Data

US 2003/0156512 A1 Aug. 21, 2003

(30) Foreign Application Priority Data

Feb. 21, 2002 (JP) ............................ 2002-044503

(51) Int. Cl.
*G11B 27/22* (2006.01)
(52) U.S. Cl. .................................. 369/47.52; 369/47.53
(58) Field of Classification Search ............ 369/47.52, 369/53.27, 44.32, 59.11, 47.53, 121, 122, 369/116; 372/30.08
See application file for complete search history.

(56) References Cited

U.S. PATENT DOCUMENTS

| | | | | |
|---|---|---|---|---|
| 4,712,218 A | * | 12/1987 | Ohnuki et al. ........... | 372/38.08 |
| 4,787,078 A | * | 11/1988 | Yokogawa ................ | 369/122 |
| 5,313,448 A | * | 5/1994 | Sukeda et al. ............. | 369/121 |
| 5,396,480 A | | 3/1995 | Morishita et al. | |
| 5,712,839 A | * | 1/1998 | Aoki ........................ | 369/47.52 |
| 5,745,463 A | | 4/1998 | Maegawa et al. | |
| 5,815,477 A | * | 9/1998 | Kimura et al. ........... | 369/47.53 |
| 6,115,338 A | | 9/2000 | Masaki et al. | |
| 6,205,102 B1 | * | 3/2001 | Spruit ...................... | 369/59.11 |
| 6,661,757 B1 | * | 12/2003 | Chuang ................... | 369/53.26 |
| 6,661,759 B1 | * | 12/2003 | Seo .......................... | 369/59.11 |
| 6,728,178 B1 | * | 4/2004 | Koishi et al. ............. | 369/47.53 |
| 2002/0018419 A1 | | 2/2002 | Watabe | |

FOREIGN PATENT DOCUMENTS

GB 2 336 463 10/1999

* cited by examiner

*Primary Examiner*—William Korzuch
*Assistant Examiner*—Tawfik Goma
(74) *Attorney, Agent, or Firm*—Ladas and Parry LLP

(57) ABSTRACT

An optical power level-controlling device controls optical power level of a laser beam irradiated on an optical disk. The optical power level takes an ERASE (reference) level, a lower BIAS level and a higher WRITE level. Recording is performed by alternating the optical power level between BIAS and WRITE levels. In a controlling part, test signals are recorded while varying the optical power level and in an OPC for setting an optimum WRITE level by reproducing the test signals. A combined control, i.e., combination of a feedback control and a fixed value control at a predetermined ratio, is performed on BIAS level during a recording operation of the test signals. Fixed value control is performed on the difference between ERASE level and BIAS level during a recording operation.

3 Claims, 10 Drawing Sheets

FIG.1

PRIOR ART

FIG.2

PRIOR ART

OPTICAL POWER LEVEL-CONTROLLING DEVICE FOR STABLE OSCILLATION OF LASER DIODE

BACKGROUND OF THE INVENTION

1. Field of the Invention

The present invention relates to an optical power level-controlling device and more particularly to an optical power level-controlling device of an optical disk device capable of recording data on a rewritable optical disk such as CD-RW.

2. Description of the Related Art

Figure 1:
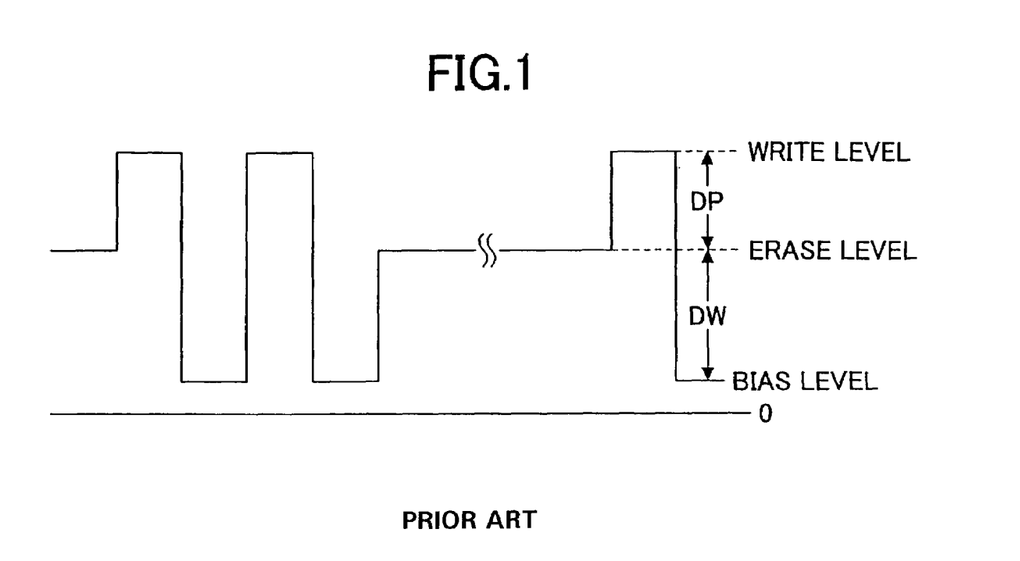
FIG. 1 is a diagram showing a waveform of a power level during a recording operation of a rewritable optical disk.

Recordable optical disk may generally be categorized into write-once read-many optical disks such as CD-R and rewritable optical disks such as CD-RW. FIG. 1 illustrates optical power level of a laser beam used for recording data on a CD-RW. In the following text, terms "power level" and "level" are understood to mean "optical power level". As can be seen in FIG. 1, the power level is varied between two values, i.e., WRITE level and ERASE level, with BIAS level being the reference level. In such a case, the laser beam at WRITE level causes a change of state of the recording layer of the optical disk from crystalline to amorphous, thereby forming a record mark. On the other hand, the laser beam at ERASE level causes a change of state of the recording layer of the optical disk from amorphous to crystalline, thereby erasing the recorded mark.

Figure 2:
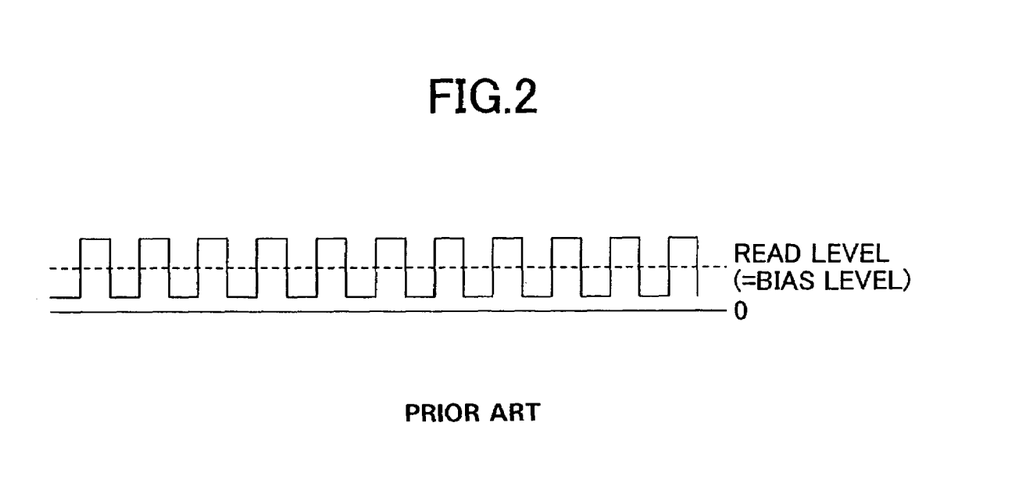
FIG. 2 is a diagram showing a waveform of a power level during reproduction of CD-RW in which a high-frequency signal is added.

As can be seen in FIG. 2, in order to reproduce information from a CD-RW, the laser beam is set at READ level which is at the same level as BIAS level and then a high-frequency signal of about 300 MHz is added thereon, so that the power level of the laser beam will be changed into a burst form (multi-mode). This is due to a return optical noise caused by a laser beam that is emitted from the laser diode, reflected on the optical disk and then returned to the laser diode. Also, oscillation of the diode can prevented from becoming unstable and being stopped. According to the above-mentioned multimode operation, oscillation of the laser diode can be stabilized.

Adding a high-frequency signal of about 300 MHz during a recording operation of a CD-RW as described above does not cause any problem during periods in which the laser beam is at BIAS (READ) level or at ERASE level. However, during periods at WRITE level, an excess current may flow in the laser diode due to the high-frequency signal. Such an excess current may shorten life duration of the laser diode. On a characteristic curve of output power level against input electric current of the laser diode shown in FIG. 5, "B" indicates BIAS level, "E" indicates ERASE level and "W" indicates WRITE level. It is to be noted that when the high-frequency signal is added, each of the points "B", "E" and "W" will move along the horizontal axis.

Accordingly, in the related art, instead of adding a high-frequency signal during recording of CD-RW, the difference between ERASE level and BIAS level (labeled "DW" in FIG. 1) is indicated by a fixed value and the difference between ERASE level and WRITE level (labeled "DP" in FIG. 1) is also indicated by a fixed value. This may cause an unstable oscillation of the laser diode due to the return noise during a recording operation.

SUMMARY OF THE INVENTION

Accordingly, it is a general object of the present invention to provide an optical power level-controlling device that can obviate the problems described above.

It is another and more specific object of the present invention to provide an optical power level-controlling device that can stabilize oscillation of a laser diode during a recording operation of a rewritable optical disk.

In order to achieve the above objects, the present invention is an optical power level-controlling device for controlling optical power level of a laser beam emitted from a light-emitting element and irradiated on an optical disk, the optical power level capable of taking an ERASE level defined as a reference level, a BIAS level lower than the ERASE level and a WRITE level higher than the ERASE level, a recording operation on the optical disk being carried out by alternating the optical power level between the BIAS level and the WRITE level, a fixed value control and a feedback control being performed on the ERASE level and on a difference between the ERASE level and the BIAS level, respectively, the device including:

a controlling part in which test signals are recorded while varying the optical power level of the laser beam and in an OPC for setting an optimum WRITE level by reproducing the test signals, the controlling part performing a combined control on the BIAS level during a recording operation of the test signals, the combined control being a combination of a feedback control and a fixed value control at a predetermined ratio, and for performing a fixed value control on the difference between the ERASE level and the BIAS level during a recording operation.

With the device described above, unstable oscillation of the laser diode due to return noise during a recording operation can be prevented since the oscillation of the laser diode is stabilized as a result of a feedback control of BIAS level.

In the preferred embodiment of the present invention, the controlling part performs a feedback control of the BIAS level while monitoring the ERASE level during a data recording operation.

With the optical power level-controlling device described above, oscillation of the laser diode can be stabilized.

In the preferred embodiment of the present invention, the optical power level-controlling device further includes a post-processing part for performing, as a post-process of the recording operation, a reproducing operation in a multimode in which a high-frequency signal is added on the BIAS level.

With the optical power level-controlling device described above, post-processing gives a stable oscillation after the recording operation.

DETAILED DESCRIPTION OF THE PREFERRED EMBODIMENTS

In the following, principles and embodiments of the present invention will be described with reference to the accompanying drawings. Reference numerals in parenthesis are indicated by way of example for ease of understanding of the invention and thus by no means limit the scope of the invention to embodiments illustrated in the drawings.

Figure 3:
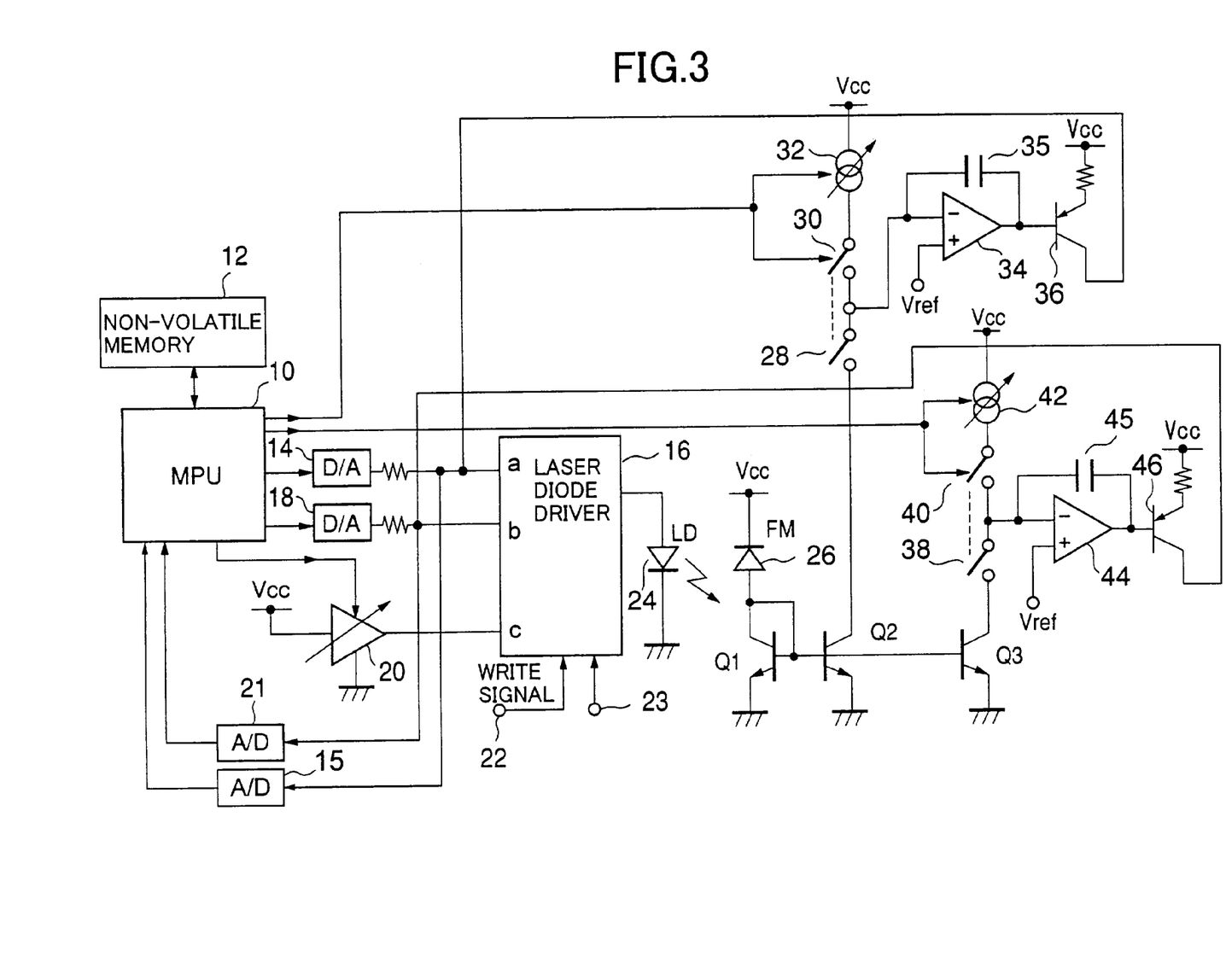
FIG. 3 is a block diagram showing an embodiment of the light level-controlling device of the present invention.

FIG. 3 shows a block diagram of an embodiment of an optical power level-controlling device of the present invention. An MPU 10 controls the entire optical power level-controlling device by making use of a non-volatile memory 12 and an internal memory. BIAS level indication data that is output from the MPU 10 is converted into an analog form at a D/A converter 14 and is supplied to terminal "a" of a laser diode driver 16. Similarly, ERASE level indication data (i.e., DW in FIG. 1) that is output from the MPU 10 is converted into an analog form at a D/A converter 18 and is supplied to terminal "b" of the laser diode driver 16. Further, WRITE level indication data (i.e., DP in FIG. 1) that is output from the MPU 10 is converted into an analog form at a D/A converter 20 and is supplied to terminal "c" of the laser diode driver 16. Voltages at terminals "a" and "b" of the laser diode driver 16 are converted into digital forms at A/D converters 15 and 21, respectively, and supplied to the MPU 10.

The laser diode driver 16 is further provided with a terminal 22 via which modulation signals used for recording are input and a terminal 23 via which a high-frequency signal of, for example, 300 MHz for a multi-mode operation is supplied. In response to the modulation signal, the laser diode driver 16 supplies an electric current to a laser diode 24 such that the laser diode 24 emits light at an optical power level of BIAS level, ERASE level or WRITE level. The emitted light is irradiated on an optical disk such that data is recorded on the optical disk.

A front monitor 26 detects power level of the laser beam that is output from the laser diode 24. The front monitor 26 may be a photo-diode that supplies a detected electric current corresponding to the detected power level to a collector of an npn transistor Q1. The transistor Q1 and npn transistors Q2 and Q3 constitutes a current mirror circuit in which detected electric currents flowing through collectors of the transistors Q2 and Q3, respectively, have the same value as the detected electric current.

The collector of the transistor Q2 is coupled to a variable current source 32 via mutually interlocked switches 28 and 30. The switches 28 and 30 are operated in accordance with an instruction supplied from the MPU 10 such that they are turned on during the BIAS level period only. The variable current source 32 supplies a constant electric current having a value determined by the instruction supplied from the MPU 10 to the switches 28 and 30. A connecting point between the switches 28 and 30 is coupled to an inverted input terminal of an operational amplifier 34.

Reference voltage Vref is supplied to a non-inverted input terminal of the operational amplifier 34. The operational amplifier 34 and a capacitor 35 together constitute a mirror integration circuit. An output voltage of the mirror integration circuit is inverted at a pnp transistor 36, superimposed onto an output of the D/A converter 14 and supplied to terminal "a" of the laser diode driver 16.

The BIAS level indication signal is supplied from the MPU 10 to the laser diode driver 16 via the D/A converter 14 and the laser diode driver 16 supplies an electric current for obtaining BIAS level to the laser diode 24. An indication signal corresponding to the above-mentioned BIAS level is supplied from the MPU 10 to the variable current source 32. An output electric current value of the variable current source 32 is, for example, i1.

A feedback control is carried out on the power level of the laser beam emitted by the laser diode 24 in the following manner. When the power level of the laser beam emitted from the laser diode 24 is lower than the indicated BIAS level, the detected electric current value of the front monitor 26 is smaller than the above-mentioned electric current value i1. Accordingly, an electric current corresponding to the difference between the electric current value i1 and the detected electric current flows in such a manner that electric charge is accumulated in the capacitor 35. This causes a drop of output voltage of the operational amplifier 34 and a rise in the voltage supplied from the pnp transistor 36 to terminal "a" of the laser diode driver 16. Accordingly, the laser diode driver 16 supplies increased amount of electric current to the laser diode 24, such that the power level of the laser beam emitted from the laser diode 24 is increased. When the power level of the laser beam emitted from the laser diode 24 is higher than the indicated BIAS level, the laser diode driver 16 operates in a reversed manner. The laser diode driver 16 supplies decreased amount of electric current to the laser diode 24. This results in a drop of the power level of the laser beam emitted from the laser diode 24. Thus, the feed back control is achieved.

The collector of the transistor Q3 is coupled to a variable current source 42 via mutually interlocked switches 38 and 40. The switches 38 and 40 operate in accordance with instructions supplied from the MPU 10 such that they are turned on during the ERASE level periods only. The variable current source 42 supplies a constant electric current having a value determined by the instructions supplied from the MPU 10 to the switches 38 and 40. A connecting point between the switches 38 and 40 is coupled to an inverted input terminal of an operational amplifier 44.

Reference voltage Vref is supplied to a non-inverted input terminal of the operational amplifier 44. The operational amplifier 44 and a capacitor 45 together constitute a mirror integration circuit. An output voltage of the mirror integration circuit is inverted at a pnp transistor 46, added onto an output of the D/A converter 14 and supplied to terminal "a" of the laser diode driver 16.

Here, the ERASE level indication signal is supplied from the MPU 10 to the laser diode driver 16 via the D/A converter 18 and the laser diode driver 16 supplies an electric current for obtaining ERASE level to the laser diode 24. Also, an indication signal corresponding to the above-mentioned ERASE level is supplied from the MPU 10 to the variable current source 42 and an output current of the variable current source 42 is, for example, i2.

A feedback control is carried out on the power level of the laser beam emitted by the laser diode 24 in the following manner. When the power level of the laser beam emitted from the laser diode 24 is lower than the indicated ERASE level, the detected electric current value of the front monitor 26 is smaller than the above-mentioned electric current value i2. Accordingly, an electric current corresponding to the difference between the electric current value i2 and the detected electric current flows in such a manner that electric charge is accumulated in the capacitor 45. This causes a drop of output voltage of the operational amplifier 44 and a rise in the voltage supplied from the pnp transistor 46 to terminal "b" of the laser diode driver 16. Accordingly, the laser diode driver 16 supplies increased amount of electric current to the laser diode 24, such that the power level of the laser beam emitted from the laser diode 24 is be increased. When the power level of the laser beam emitted from the laser diode 24 is higher than the indicated ERASE level, the laser diode driver 16 operates in a reversed manner. The laser diode driver 16 supplies decreased amount of electric current to the laser diode 24. This results in a drop of the power level of the laser beam emitted from the laser diode 24. Thus, the feed back control is achieved.

Figure 4:
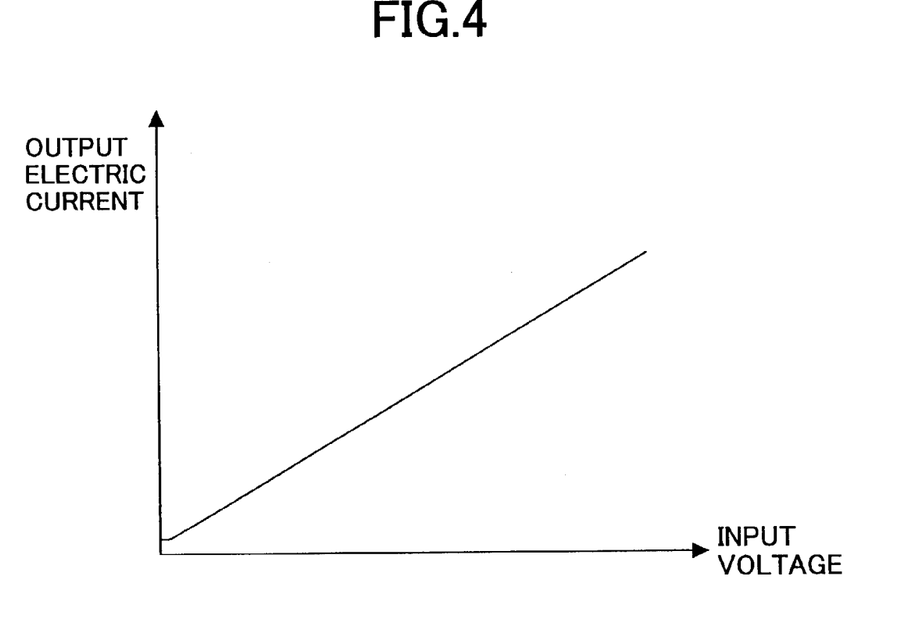
FIG. 4 shows a characteristic curve of a laser diode driver illustrated as plot of output electric current against input voltage.
Figure 5:
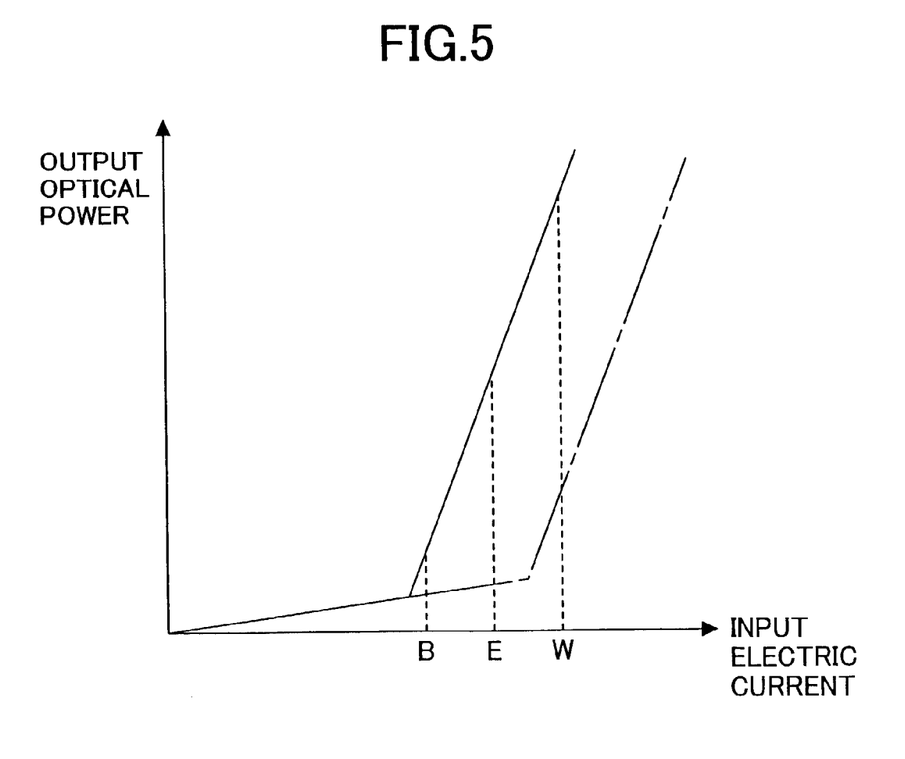
FIG. 5 shows a characteristic curve of a laser diode illustrated as plot of output power level against input electric current.

FIG. 4 shows an example of a characteristic curve of output current against input voltage at terminal "b" of the laser diode driver 14 and FIG. 5 shows an example of a characteristic curve of output power level against input electric current of the laser diode 24. On the characteristic curve of output power level against input electric current of the laser diode shown in FIG. 5, "B" indicates BIAS level, "E" indicates ERASE level and "W" indicates WRITE level.

Figure 6:
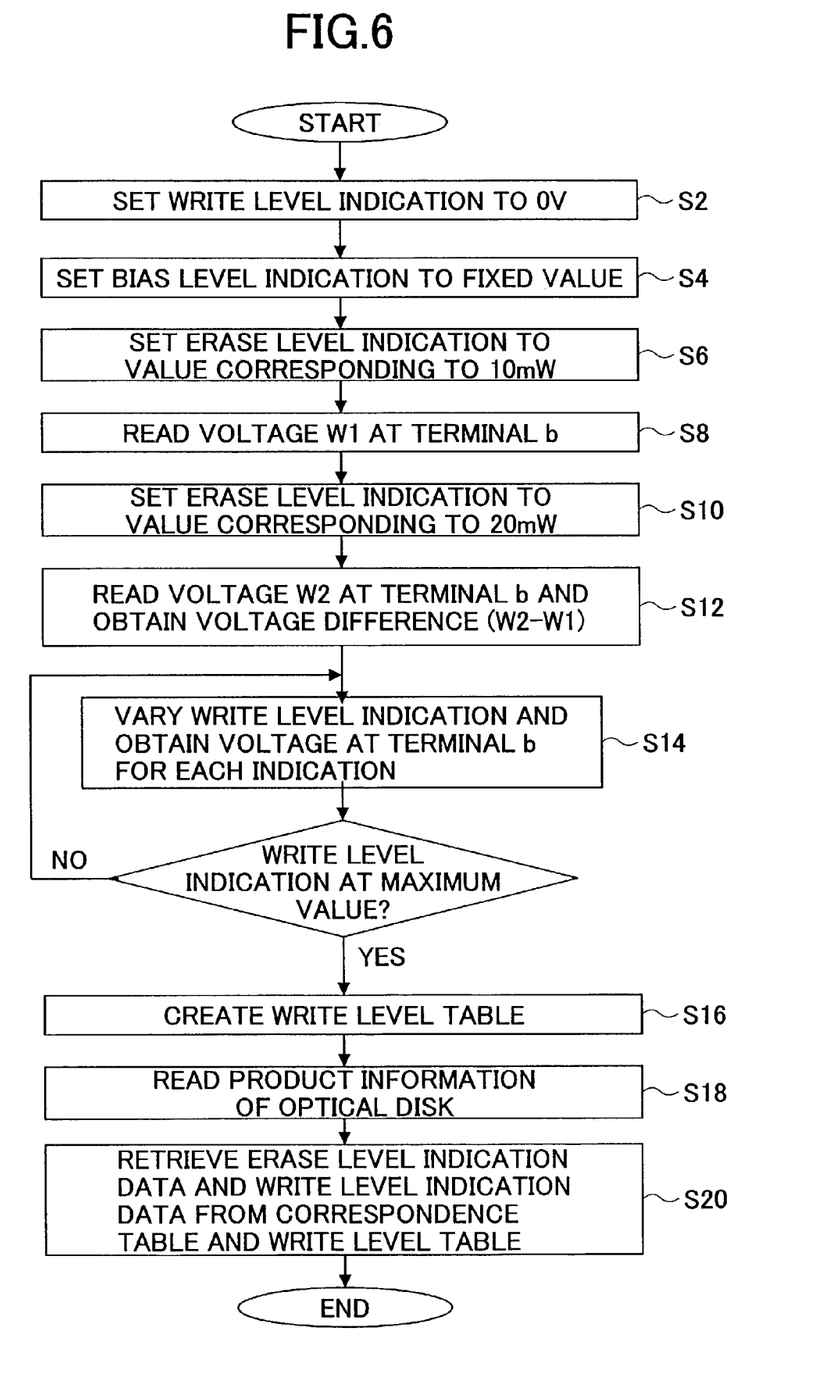
FIG. 6 shows a flowchart of an embodiment of a WRITE level-setting process that is executed by an MPU.

FIG. 6 is a flowchart of an embodiment of a WRITE level-setting process that is performed by the MPU 10 of the device of the present invention. This process may be performed upon loading of an optical disk into an optical disk device and at predetermined intervals thereafter.

As shown in FIG. 6, in step S2, the MPU 10 produces a WRITE level indication data. As a result of the WRITE level indication data, an output of the D/A converter 20 is set at 0V, the variable current source 32 is set to a predetermined value and the switches 28 and 30 are switched on to perform feedback control of the BIAS level (it is necessary that it exceeds input current level B in FIG. 5). Then, voltage at terminal "a" of the laser diode driver 16 is obtained by the A/D converter 15 and the obtained value is used as a fixed value in step S4. In step S4, the MPU 10 generates a BIAS level indication data for setting the output of the D/A converter 14 to the above-mentioned fixed value (it is necessary that it exceeds the input electric current level B in FIG. 5). While outputting the fixed value from the D/A converter 14, the switches 28 and 30 should be switched off. In step S6, the ERASE level indication data is used for setting the variable current source 42 to a first value (for example, a value corresponding to the output power 10 mW of the laser diode). Then, in step S8, the voltage at terminal "b" of the laser diode driver 16 is read from the A/D converter 21 and stored as voltage WI.

Then, in step S10, the MPU 10 generates a ERASE level indication data for setting the output of the D/A converter 18 to a second value (e.g., a value corresponding to the output light power 20 mW of the laser diode).

Then, in step S12, the voltage at terminal "b" of the laser diode driver 16 is read from the A/D converter 21 and stored as voltage W2. Then, a voltage difference (W2−W1) corresponding an increased amount 10 mW of the output optical power level is derived.

Figure 7:
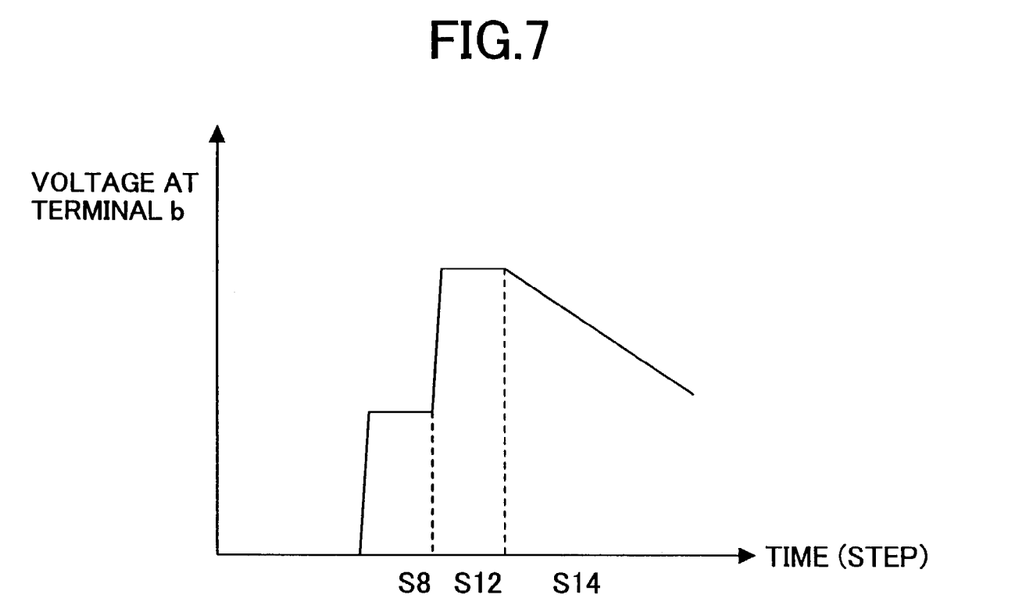
FIG. 7 is a graph showing voltage change at terminal "b" of the laser diode driver.

In step S14, the WRITE level indication data that is supplied to the A/D converter 20 is sequentially increased from the lowest value towards the highest value. In this manner, the voltage at terminal "b" of the laser diode driver 16 is read from the A/D converter 21 for each value of the WRITE level indication data and is stored. When the WRITE level indication data is sequentially increased from the lowest value towards the highest value in a manner described above, a feedback control is performed and thus the voltage at terminal "b" gradually decreases. FIG. 7 is a graph showing voltage change at terminal "b" of the laser diode driver for steps S2 through S14. Thus, the change in voltage at terminal "b" corresponding to the WRITE level indication data can be obtained, i.e., it is possible to obtain the change of the output power measured in mW.

Then, in step S16, using the relationship between the voltage difference (W2−W1) and the change in power (mW) of the output power corresponding to each value of the WRITE level indication data, the actual ERASE level is for example set in a step-by-step manner from 10 mW to 20 mW. The corresponding ERASE level indication data (correspond to DW) is obtained for each actual ERASE level. Further, for each actual ERASE level, a ratio DW/DP of the difference between ERASE level and BIAS level DW to the difference between WRITE level and ERASE level DP is changed in a step-by-step manner within a range of about 10% to 15%. In this manner, the WRITE level indication data (corresponds to DP) corresponding to each of the ratio DW/DP is derived and is stored in a WRITE level table in an internal memory (volatile memory) of the MPU 10.

In step S18, the MPU 10 reads out product information (e.g., manufacturer ID) of the optical disk from the loaded optical disk. It is to be noted that a look-up table showing correspondence between optimum ERASE level and optimum ratio DW/DP for each product information of the optical disk is prestored in the non-volatile memory 12. In step S20, the MPU 10 uses the product information of the optical disk to refer to the look-up table to obtain the optimum ERASE level and the optimum ratio DW/DP. The optimum ERASE level and the optimum ratio DW/DP are used to refer to the WRITE level table to obtain the ERASE level indication data and the WRITE level indication data used for actual recording.

Thus, a recording operation of this optical disk can be performed with the optimum ERASE level corresponding to the recording characteristic of the loaded optical disk (CD-R) and the corresponding WRITE level. Therefore, it is possible to reduce jitter during reproduction of the optical disk.

According to the present invention, ERASE level indication data (corresponds to DW) is derived for each of the actual ERASE level and the ratio DW/DP of the difference DP between the ERASE level and the BIAS level to the difference DP between the WRITE level and the ERASE level is varied within a range of approximately 10% to 15% in a step-by-step manner to obtain the WRITE level indication data (corresponds to DP) to create the WRITE level table. Therefore, even if there is a change of environmental temperature or there is an aging of elements such as the laser diode 24 and front monitor 26, the ERASE level indication data and the WRITE level indication data for obtaining the actual ERASE level and the actual WRITE level can be obtained in a high accuracy. Therefore, light level control can be performed with an improved accuracy.

The present invention can be applied to the optical power level-controlling device of the optical disk device for performing a recording operation of CD-RWs. In such a case, in FIGS. 3 and 6, "BIAS level", "ERASE level" and "WRITE level" should be replaced by "BIAS level", "ERASE level", and "ERASE level", respectively. In this manner, a recording operation of the optical disk can be performed with the optimum erase level corresponding to the recording characteristic of the loaded optical disk (CD-RW) and corresponding optimum ERASE level. Therefore, the reproducing operation can be performed with reduced jitter.

Upon loading an optical disk in an optical disk device, OPC (Optimum Power Control) is performed for setting optimum WRITE level. OPC is performed by changing the power level of the laser beam in, for example, 15 steps to record test signals in PCA (Power Calibration Area) at the central part of the optical disk and then reproducing information in PCA to determine the optimum WRITE level.

In the present invention, a recording operation is performed in a combined control mode in which a fixed value and a feedback control is used in such a manner that a predetermined ratio, for example about 70%, of the laser beam is determined by a fixed value and the remaining part, for example about 30%, is determined by a feed back control. This will be described below.

Figure 8:
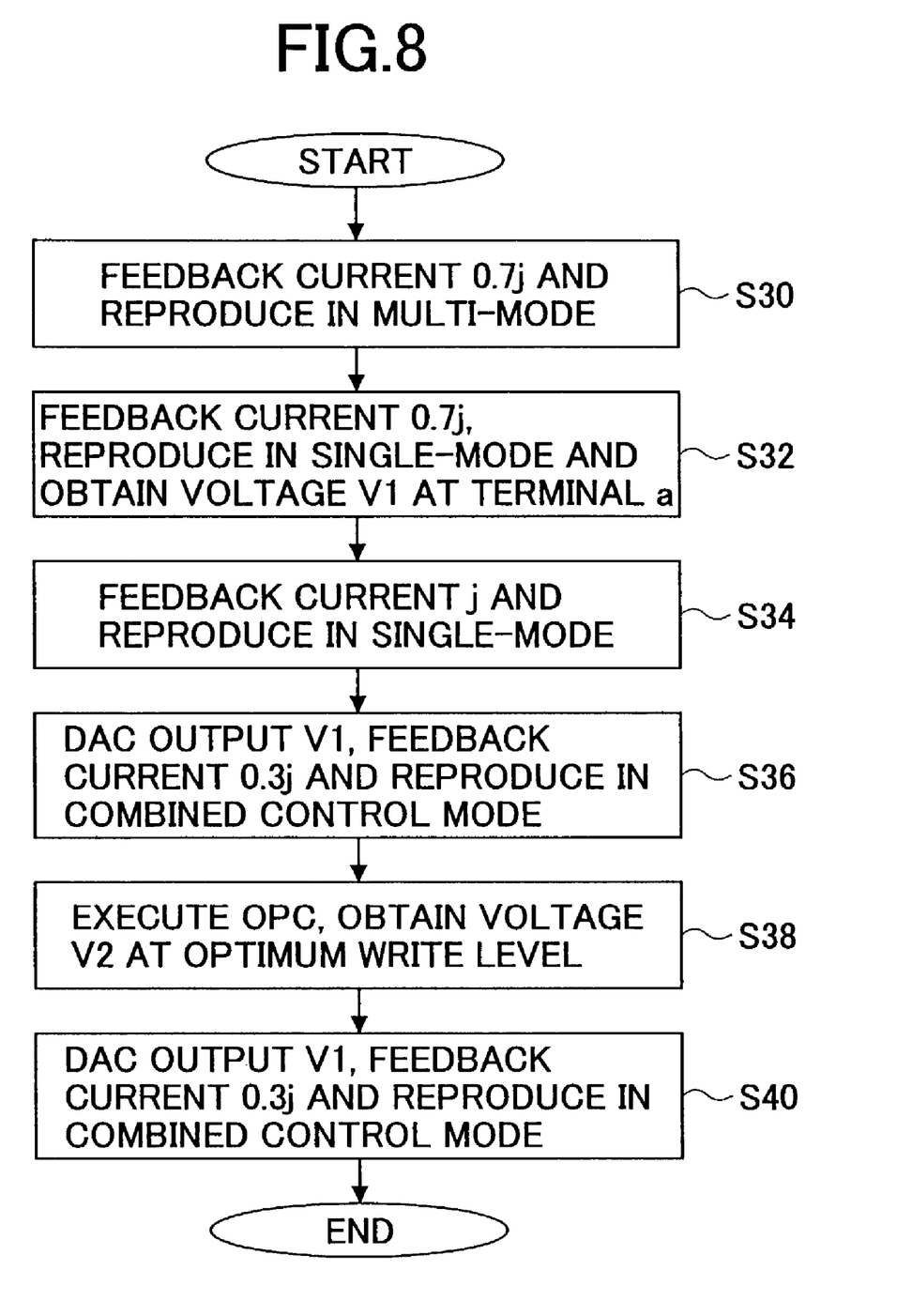
FIG. 8 shows a flowchart of a level-setting process upon OPC performed by the MPU.

FIG. 8 shows a flowchart of a level-setting process upon OPC performed by the MPU 10 of the present invention. This process is performed, for example, when an optical disk is loaded into an optical disk device.

In step S30, a feedback control is carried out by generating an instruction for switching on the switches 28 and 30 and for supplying an electric current of 0.7j (j is an electric current that corresponds to READ level of, for example, 1 mW) and a high-frequency signal is supplied from the terminal 23 to the laser diode driver 16 to provide a multimode reproduction state. Then, in step S32, while carrying out a feedback control, the supply of high-frequency signal is ceased to provide a single-mode reproduction state. In this state, voltage V1 at terminal "a" of the laser diode driver 16 is obtained from the A/D converter 15 and is stored in a memory in MPU 10.

In step S34, an instruction to generate an electric current of j is supplied to the variable current source 32 to carry out a feedback control and the supply of high-frequency signal is ceased to provide a single-mode reproduction state. In step S36, the BIAS level indication data is generated. In response to the BIAS level indication data, voltage V1 (corresponds to electric current 0.7j) obtained in step S32 is set to an output of the D/A converter (DAC) 14. Also, an instruction to generate an electric current of j is supplied to the variable current source 32 (the setting is 1.0 mW and therefore it is required to supply an electric current corresponding to the setting to the laser diode and about 70% of the electric current is supplied from the D/A converter 14) to carry out a feedback control and the supply of high-frequency signal is ceased to provide a single-mode reproduction state. Further, a 30% feedback control is carried out and supply of high-frequency signal is ceased to provide a reproduction state of a combined control mode.

Figure 12A:
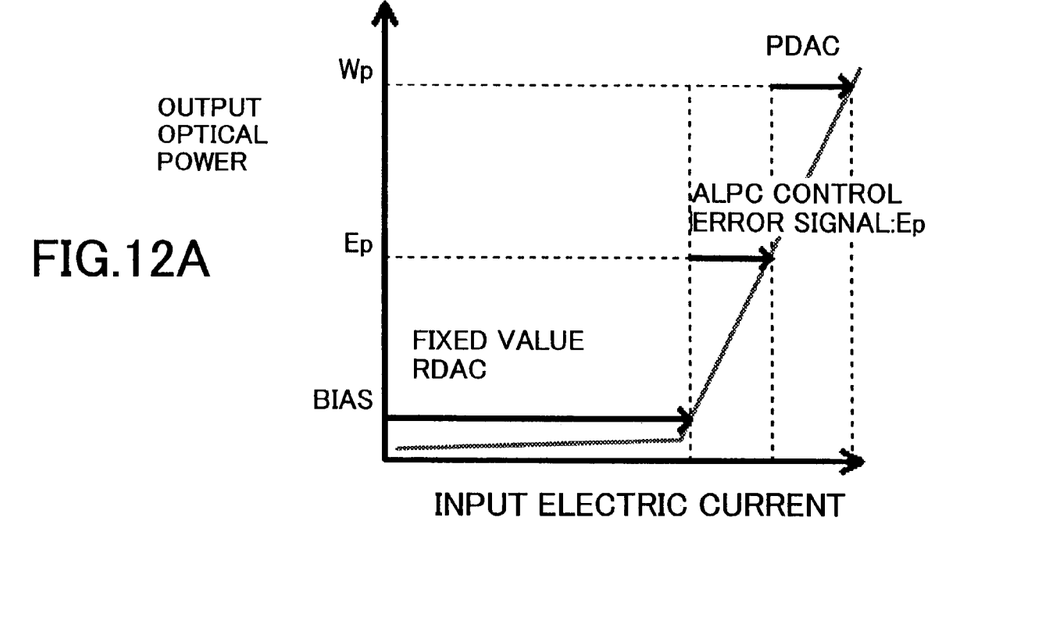
FIG. 12A is a diagram showing how a control process is carried out during OPC.

Then, in step S38, OPC is performed to obtain the optimum WRITE level upon recording and, at the same time, voltage V2 at terminal "b" of the laser diode driver 16 at the optimum ERASE level is obtained from the A/D converter 21 and stored in a memory in the MPU 10. It is to be noted that during OPC, the switches 38 and 40 are switched on and an instruction to generate an electric current of k (corresponds to DW in FIG. 1) is supplied to the variable current source 42 and a feedback control of ERASE level is carried out. This is shown in FIG. 12A.

In step 40, in response to the BIAS level indication data, voltage V1 (corresponds to electric current 0.7j) obtained in step S32 is set to an output of the D/A converter (DAC) 14, an instruction to generate an electric current of j is supplied to the variable electric current source 32 to carry out a 30% feedback control and supply of high-frequency signal is ceased to provide a reproduction state of a combined control mode. Thereafter, this process is terminated.

Figure 9:
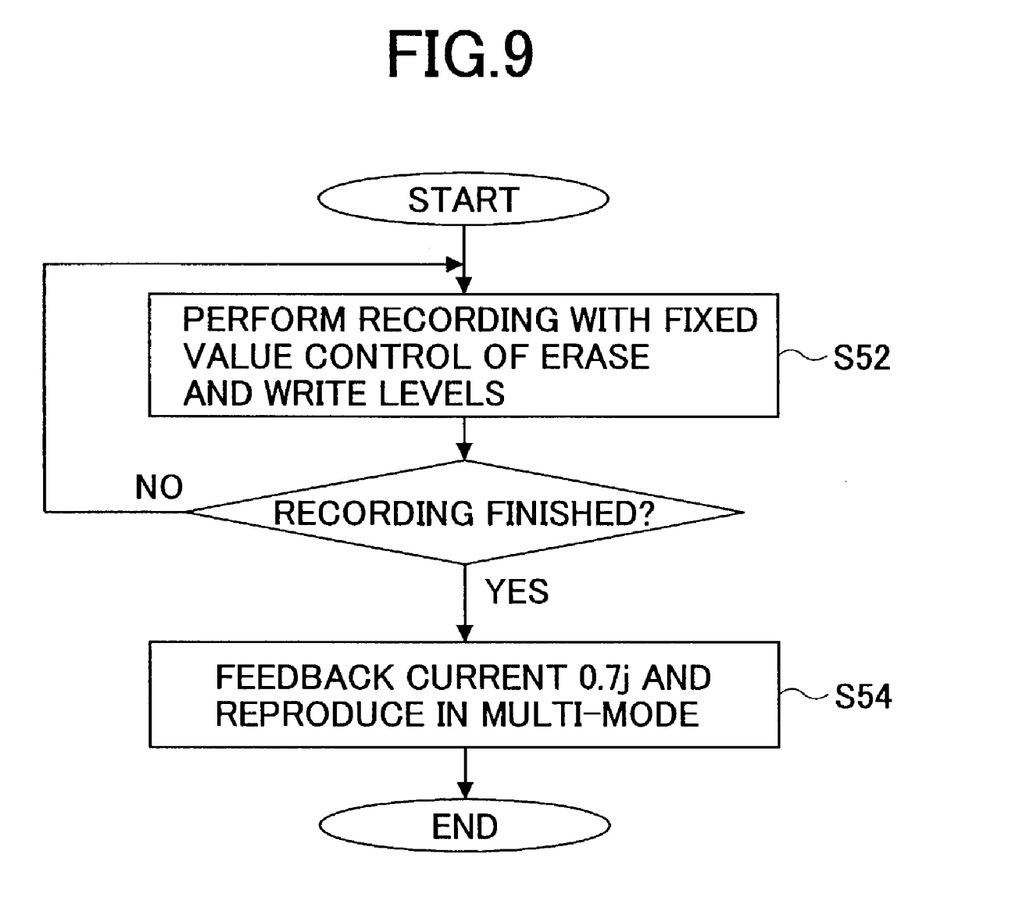
FIG. 9 shows a flowchart of a level-setting process upon a recording operation performed by the MPU.

FIG. 9 shows a flowchart of a level-setting process during data recording that is performed by the MPU 10 of the present invention. In step S52, the switches 38 and 40 are switched off and a voltage corresponding to voltage V2 derived in step S38 during OPC is set to an output of the D/A converter (DAC) 18 by the ERASE level indication data and a value obtained in the WRITE level-setting process of FIG. 6 is set to an output of the D/A converter (DAC) 20 by the WRITE level indication data. Then, an instruction to generate an electric current corresponding to the optimum ERASE level is supplied to the variable electric current source 32 to carry out a data recording operation in a single mode recording state.

Figure 12B:
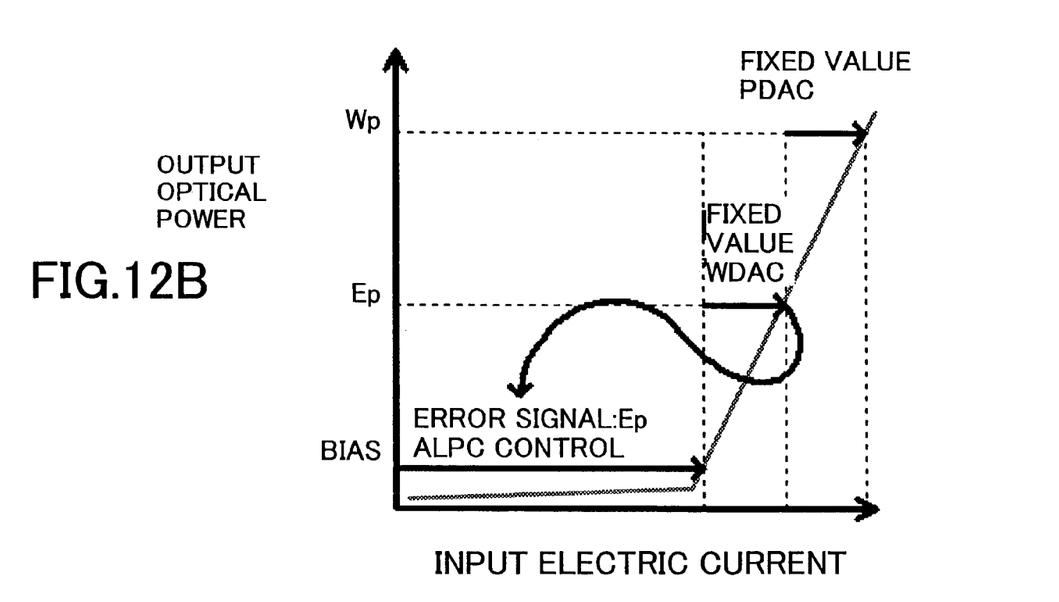
FIG. 12B is a diagram showing how a control process is carried out during a recording operation.

The difference between BIAS level and ERASE level is fixed by the D/A converter 18 and a feedback control is performed on BIAS level while monitoring ERASE level. This is shown in FIG. 12B. The feedback control of BIAS level is performed instead of a control process using sampling which cannot be performed for a high-speed recording operation since the characteristic curve shown by a solid line in FIG. 5 will be shifted to a dash-dot line if there is a temperature rise.

After the recording operation, post-processing is carried out in step S54. The switches 28 and 30 are switched on and an instruction to generate an electric current of 0.7j is supplied to the variable electric current source 32 to carry out a feedback control and high-frequency signal is supplied to the laser diode driver 16 via a terminal 23 to provide a multimode reproduction state. Thereafter, this process is terminated.

As has been described above, during an OPC recording operation, BIAS level is controlled in a combined control mode of a fixed value control and a feedback control and ERASE and WRITE levels controlled by a fixed value control are added to BIAS level. Therefore, unstable oscillation of the laser diode due to return noise during an OPC recording operation can be prevented since the oscillation of the laser diode is stabilized as a result of a feedback control of BIAS level. Also, during a data-recording operation, oscillation of the laser diode can be stabilized by a feedback control of the BIAS level while monitoring the ERASE level.

Figure 10:
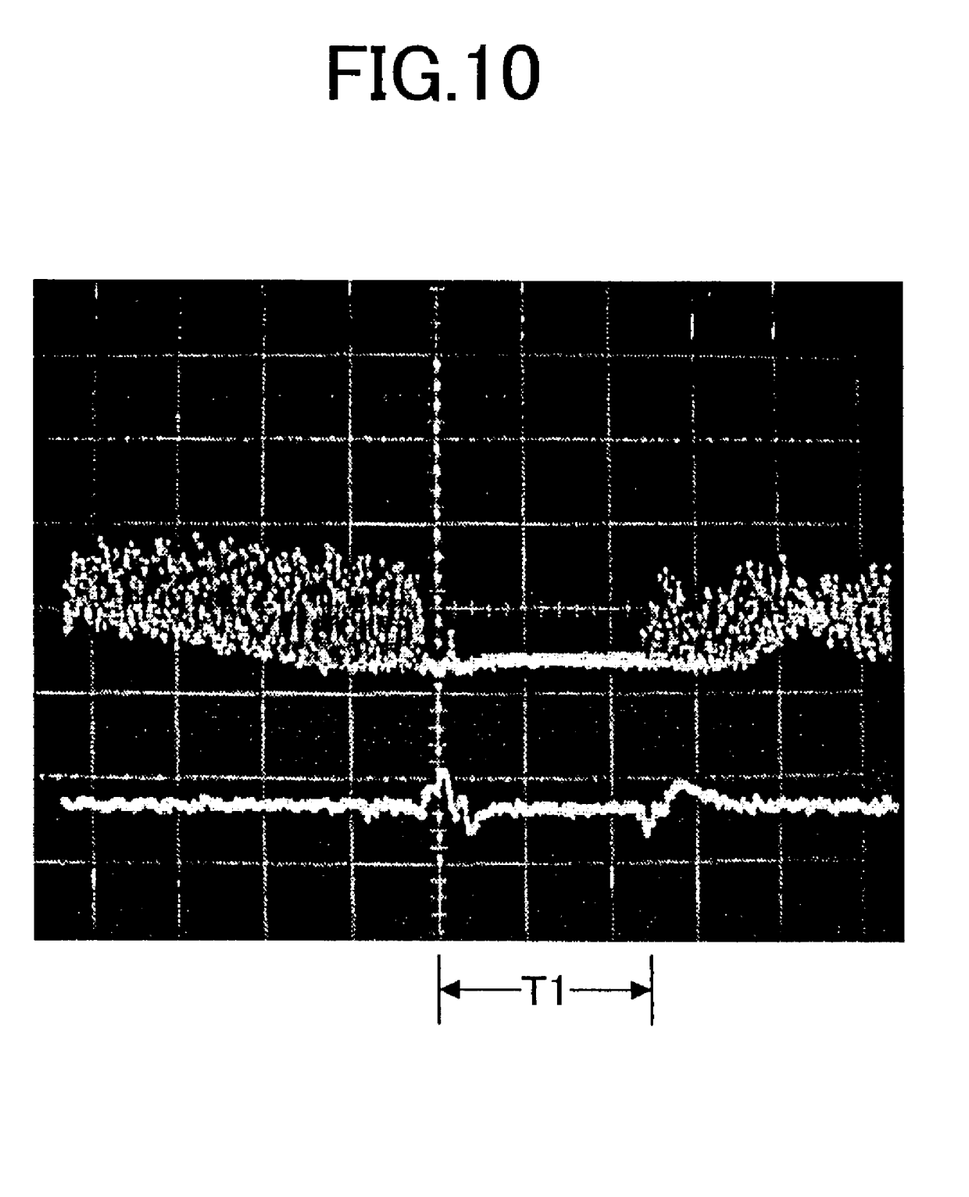
FIG. 10 is a diagram showing a driving waveform of the laser diode at a defective part for a fixed value control of BIAS level of the related art.

FIG. 10 shows a driving waveform of the laser diode (shown on an upper part of the diagram) and a focus drive waveform (shown in a lower part of the diagram) at a defective part of an optical disk during a recording operation in which BIAS level is controlled by a fixed value control in a single mode without adding a high-frequency signal as in the related art. As shown in FIG. 10, amplitude of the driving waveform of the laser diode is substantially zero during period T1 that corresponding to the defective part. During period T1, oscillation of the laser diode is ceased.

Figure 11:
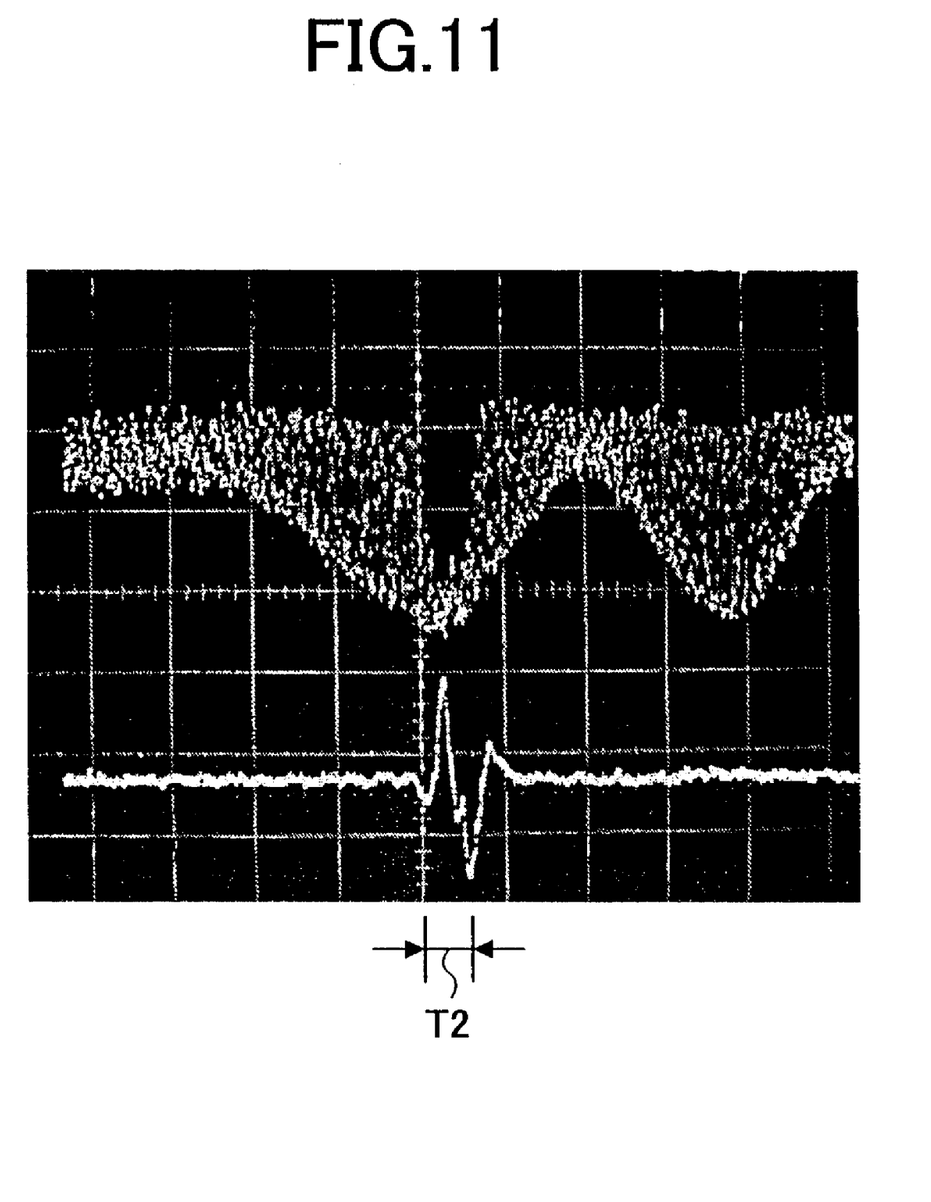
FIG. 11 is a diagram showing a driving waveform of the laser diode at a defective part for a fixed value control of BIAS level of the present invention.

FIG. 11 shows a driving waveform of the laser diode (shown on an upper part of the diagram) and a focus drive waveform (shown in a lower part of the diagram) at a defective part of an optical disk during a recording operation in which BIAS level is controlled in a combined control mode of fixed value control and a feedback control in a single mode without adding a high-frequency signal of the present invention. As shown in FIG. 11, amplitude of the driving waveform of the laser diode becomes small during period T1 that corresponds to the defective part but is not zero. During period T2, it is achieved to prevent oscillation of the laser diode from being ceased.

Further, the present invention is not limited to these embodiments, and variations and modifications may be made without departing from the scope of the present invention.

The present application is based on Japanese priority application No. 2002-044503 filed on Feb. 21, 2002, the entire contents of which are hereby incorporated by reference.

What is claimed is:

1. An optical power level-controlling device for controlling optical power level of a laser beam emitted from a light-emitting element and irradiated on an optical disk, said optical power level capable of taking an ERASE level defined as a reference level, a BIAS level lower than said ERASE level and a WRITE level higher than said ERASE level, a recording operation on said optical disk being carried out by alternating the optical power level between said BIAS level and said WRITE level, a fixed value control and a feedback control being performed on said ERASE level and on a difference between said ERASE level and said BIAS level, respectively, said device comprising:

a controlling part in which test signals are recorded while varying the optical power level of the laser beam and in an OPC for setting an optimum WRITE level by reproducing the test signals, said controlling part performing a combined control on said BIAS level during a recording operation of said test signals, said combined control being a combination of a feedback control and a fixed value control at a predetermined ratio, and for performing a fixed value control on said difference between said ERASE level and said BIAS level during a recording operation.

2. The optical power level-controlling device as claimed in claim 1, wherein said controlling part performs a feedback control of said BIAS level while monitoring said ERASE level during a data recording operation.

3. The optical power level-controlling device as claimed in claim 1, further comprising:

a post-processing part for performing, as a post-process of said recording operation, a reproducing operation in a multimode in which a high-frequency signal is added on said BIAS level.

* * * * *